United States Patent
Aleem et al.

(10) Patent No.: US 12,136,178 B2
(45) Date of Patent: Nov. 5, 2024

(54) VALIDATION OF MODELING AND SIMULATION OF VIRTUAL TRY-ON OF WEARABLE DEVICE

(71) Applicant: GOOGLE LLC, Mountain View, CA (US)

(72) Inventors: Idris Syed Aleem, Kitchener (CA); Rees Anwyl Samuel Simmons, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 239 days.

(21) Appl. No.: 17/650,470

(22) Filed: Feb. 9, 2022

(65) Prior Publication Data

US 2023/0252745 A1 Aug. 10, 2023

(51) Int. Cl.
*G06T 19/20* (2011.01)
*G06N 20/00* (2019.01)

(52) U.S. Cl.
CPC ............. *G06T 19/20* (2013.01); *G06N 20/00* (2019.01); *G06T 2219/2004* (2013.01)

(58) Field of Classification Search
CPC .. G06T 19/20; G06T 2219/2004; G06N 20/00
See application file for complete search history.

(56) References Cited

U.S. PATENT DOCUMENTS

| | | | | |
|---|---|---|---|---|
| 6,736,506 B2 * | 5/2004 | Izumitani | ............. | G02C 13/003 351/159.75 |
| 8,708,494 B1 * | 4/2014 | Surkov | ................ | G06V 40/171 351/159.75 |
| 8,733,936 B1 * | 5/2014 | Kornilov | .................. | A61B 3/10 351/159.75 |
| 9,198,576 B1 * | 12/2015 | Barnes | ................. | G02C 13/005 |
| 9,513,494 B2 * | 12/2016 | Cussac | ...................... | G02C 7/02 |
| 10,121,178 B2 * | 11/2018 | Adler | ......................... | G06T 7/55 |
| 10,762,709 B2 * | 9/2020 | Jung | ....................... | G06F 3/011 |
| 11,215,845 B2 * | 1/2022 | Schwarz | ................. | G06F 30/27 |
| 11,688,097 B2 * | 6/2023 | Barton | .................. | G06V 10/82 382/100 |

(Continued)

OTHER PUBLICATIONS

Goldberg, "Putting Virtual Glasses on a Real Face: Warby Parker's Virtual Try-On Placement Algorithm", Apr. 2, 2019, 6 pages.

(Continued)

*Primary Examiner* — Charles L Beard
(74) *Attorney, Agent, or Firm* — Brake Hughes Bellermann LLP

(57) ABSTRACT

Systems and methods for validation of modeling and simulation systems that provide for the virtual try-on of wearable devices, such as glasses, by a user, and for the virtual fitting of selected wearable devices for the user. Wearable fit measurements, display fit measurements, ophthalmic fit measurements and other such measurements associated with the fit and function of the wearable device may be detected from image data capturing the wearable device worn by the user. The detected measurements may be compared to corresponding measurements detected in a virtual simulation of the wearable device worn by the user. The comparison may provide for validation and increased accuracy/realism of the modeling and simulation systems.

24 Claims, 12 Drawing Sheets

(56) References Cited

U.S. PATENT DOCUMENTS

| | | | |
|---|---|---|---|
| 11,798,248 B1* | 10/2023 | Shchurko | G06T 19/006 |
| 2003/0123026 A1* | 7/2003 | Abitbol | G06Q 30/0641 |
| | | | 351/204 |
| 2004/0004633 A1* | 1/2004 | Perry | G06Q 30/0603 |
| | | | 715/728 |
| 2008/0074440 A1* | 3/2008 | Xie | G06Q 10/087 |
| | | | 345/634 |
| 2008/0201329 A1* | 8/2008 | Xie | G06Q 30/0603 |
| 2008/0201641 A1* | 8/2008 | Xie | G06T 19/00 |
| | | | 351/200 |
| 2009/0273612 A1* | 11/2009 | Xie | G02C 13/003 |
| | | | 345/630 |
| 2009/0319337 A1* | 12/2009 | Xie | G06Q 10/063 |
| | | | 705/26.1 |
| 2011/0071804 A1* | 3/2011 | Xie | G06T 19/00 |
| | | | 703/1 |
| 2013/0088490 A1* | 4/2013 | Rasmussen | G06T 19/006 |
| | | | 345/421 |
| 2013/0314410 A1* | 11/2013 | Gravois | G06V 40/16 |
| | | | 345/420 |
| 2013/0314413 A1* | 11/2013 | Coon | A61B 3/111 |
| | | | 345/420 |
| 2013/0321412 A1* | 12/2013 | Coon | G02C 13/003 |
| | | | 345/420 |
| 2013/0335416 A1* | 12/2013 | Coon | G06Q 30/0643 |
| | | | 345/423 |
| 2014/0240470 A1* | 8/2014 | Dias Da Silva | G02C 13/005 |
| | | | 348/49 |
| 2014/0354947 A1* | 12/2014 | Hsieh | G02C 13/003 |
| | | | 351/204 |
| 2015/0055086 A1* | 2/2015 | Fonte | G02C 7/027 |
| | | | 700/98 |
| 2015/0279117 A1* | 10/2015 | Schimke | G06V 40/172 |
| | | | 345/633 |
| 2015/0293382 A1* | 10/2015 | Jethmalani | G02C 13/003 |
| | | | 351/204 |
| 2015/0310672 A1* | 10/2015 | Choukroun | G06T 17/205 |
| | | | 345/633 |
| 2016/0035133 A1* | 2/2016 | Ye | G06T 15/60 |
| | | | 345/419 |
| 2016/0171287 A1* | 6/2016 | Surkov | G06T 7/60 |
| | | | 351/204 |
| 2016/0178936 A1* | 6/2016 | Yang | G06T 19/20 |
| | | | 351/246 |
| 2016/0217609 A1* | 7/2016 | Kornilov | G06T 15/60 |
| 2016/0246078 A1* | 8/2016 | Choukroun | G06T 7/60 |
| 2018/0005448 A1* | 1/2018 | Choukroun | G06T 5/50 |
| 2018/0017815 A1* | 1/2018 | Chumbley | G02C 7/027 |
| 2018/0096537 A1* | 4/2018 | Kornilov | G06V 20/20 |
| 2018/0164609 A1* | 6/2018 | Liang | A61B 3/10 |
| 2018/0164610 A1* | 6/2018 | Liang | H04N 13/204 |
| 2018/0247356 A1* | 8/2018 | Thompson | G06Q 30/0621 |
| 2018/0357819 A1* | 12/2018 | Oprea | G06T 19/00 |
| 2019/0011731 A1* | 1/2019 | Teodorovic | H04N 7/183 |
| 2019/0164210 A1* | 5/2019 | Kornilov | G06Q 30/0631 |
| 2019/0333480 A1* | 10/2019 | Lang | G06F 3/011 |
| 2020/0077937 A1* | 3/2020 | Richer | A61B 5/6814 |
| 2020/0142224 A1* | 5/2020 | Schwarz | G02C 13/003 |
| 2020/0160556 A1* | 5/2020 | Cook | G02C 13/003 |
| 2020/0209652 A1* | 7/2020 | El-Hajal | G02C 13/001 |
| 2020/0219326 A1* | 7/2020 | Goldberg | G06T 7/75 |
| 2020/0233239 A1* | 7/2020 | Schwarz | G02C 13/005 |
| 2020/0393704 A1* | 12/2020 | Teodorovic | G06T 11/60 |
| 2021/0065285 A1* | 3/2021 | Goldberg | G02C 13/003 |
| 2021/0088811 A1* | 3/2021 | Varady | G06V 10/44 |
| 2021/0090347 A1* | 3/2021 | Poliakov | G06T 3/40 |
| 2021/0173230 A1* | 6/2021 | Yang | G02C 5/008 |
| 2021/0181538 A1* | 6/2021 | Han | G06T 17/00 |
| 2021/0217249 A1* | 7/2021 | Sung | G06V 20/20 |
| 2021/0231974 A1* | 7/2021 | Kelly | G02C 13/003 |
| 2021/0264684 A1* | 8/2021 | Mercer | G06V 40/171 |
| 2021/0281802 A1* | 9/2021 | Kirisken | H04N 7/15 |
| 2021/0327148 A1* | 10/2021 | Goldberg | G06T 7/70 |
| 2021/0327149 A1* | 10/2021 | de Keyser | G06T 19/20 |
| 2022/0114636 A1* | 4/2022 | Lakkapragada | G02C 13/005 |
| 2022/0252906 A1* | 8/2022 | Schwarz | G06F 30/10 |
| 2022/0300728 A1* | 9/2022 | Assouline | G06Q 30/0631 |
| 2022/0301272 A1* | 9/2022 | Assouline | G06T 7/50 |
| 2022/0350985 A1* | 11/2022 | Aleem | G06F 3/013 |
| 2023/0020160 A1* | 1/2023 | Bonnin | G06T 7/74 |
| 2023/0028741 A1* | 1/2023 | Allione | G06T 11/60 |
| 2023/0033535 A1* | 2/2023 | Ito | G02C 13/003 |
| 2023/0139626 A1* | 5/2023 | Berliner | G06F 1/1694 |
| | | | 345/156 |
| 2023/0214004 A1* | 7/2023 | Ishikawa | G06F 3/0484 |
| | | | 345/156 |
| 2023/0252655 A1* | 8/2023 | Aleem | G06T 19/20 |
| | | | 382/286 |
| 2023/0252721 A1* | 8/2023 | Aleem | G06Q 30/0643 |
| | | | 345/41 |
| 2023/0360350 A1* | 11/2023 | Kulkarni | G06T 7/579 |
| 2023/0410344 A1* | 12/2023 | Turner | H04N 23/80 |
| 2023/0410355 A1* | 12/2023 | Aleem | G02C 13/005 |
| 2023/0419722 A1* | 12/2023 | Jadidian | G06V 40/174 |
| 2024/0061278 A1* | 2/2024 | Leite | G06V 10/82 |
| 2024/0135664 A1* | 4/2024 | Varady | G06T 7/251 |
| 2024/0177419 A1* | 5/2024 | Saito | G06T 7/50 |
| 2024/0249477 A1* | 7/2024 | Aleem | G02C 13/003 |

OTHER PUBLICATIONS

Zhang, "Augmented Reality Virtual Glasses Try-On Technology Based on IOS Platform", EURASIP Journal on Image and Video Processing; 2018, 19 pages.

\* cited by examiner

VALIDATION OF MODELING AND SIMULATION OF VIRTUAL TRY-ON OF WEARABLE DEVICE

FIELD

This description relates to the simulation of a wearable device on a user, and in particular, to the validation of the simulation of a head-mounted wearable device on the head of the user.

BACKGROUND

Wearable devices may include head-mounted devices, ear-worn devices, hand and/or wrist worn devices, and the like. A manner in which the wearable device fits a particular user may be dependent on features specific to the user and how the wearable device interacts with the features associated with the specific body part at which the wearable device is worn by the user. A user may want to customize a wearable device such as, for example, a pair of glasses, for fit and/or function including, for example, selection of frames, incorporation of prescription lenses, incorporation of a display device, incorporation of computing capabilities, and other such features. Many existing systems for procurement of these types of wearable devices do not provide for accurate customization and fitting without access to a retail establishment. Existing virtual systems may provide a virtual try-on capability, superimposing an image of selected eyewear onto an image of the user. However, such systems may not necessarily be capable of providing accurate fitting of selected eyewear for a specific user.

SUMMARY

In one general aspect, a method includes capturing, by an image capture assembly of a computing system, a reference image; detecting, in the reference image, a wearable device worn by a user and at least one measurement associated with the wearable device worn by the user in the reference image; generating, by a simulation module of the computing system, a rendered image, the rendered image including a virtual rendering of a wearable device on an image of the user; comparing the at least one measurement associated with the wearable device worn by the user in the reference image to a corresponding measurement in the rendered image; and in response to a determination that a difference between the at least one measurement associated with the wearable device worn by the user in the reference image and the corresponding measurement in the rendered image is greater than or equal to a threshold value, triggering the training of at least one machine learning model to adjust a placement position of the wearable device on the user.

In some implementations, generating the rendered image includes capturing, by the image capture assembly, a base image, the base image capturing a body portion of the user on which the wearable device is to be worn; identifying the wearable device captured in the reference image; retrieving, from a database of the computing system, a model of the wearable device; and superimposing a virtual rendering of the wearable device onto the base image. In some implementations, identifying the wearable device captured in the reference image includes detecting at least one visual marker or at least one known feature of the wearable device in the reference image; and identifying the wearable device based on the detected at least one visual marker or the at least one known feature. In some implementations, identifying the wearable device includes matching the detected at least one visual marker or the at least one known feature with the wearable device in a database of the computing system; and retrieving configuration information associated with the wearable device from the database.

In some implementations, the wearable device is a pair of glasses and wherein the reference image includes an image of the glasses worn on a face of the user. In some implementations, detecting the at least one measurement includes detecting at least one visual marker or at least one known physical feature on a frame portion of the glasses; matching the detected at least one visual marker or the detected at least one physical feature with one of a plurality of wearable devices in a database of the computing system; identifying the glasses based on the matching; and retrieving configuration information associated with the glasses from the database. In some implementations, generating the rendered image includes capturing, by the image capture assembly, a base image, the base image including an image of at least a portion of a face and a head of the user; retrieving, from a database of the computing system, a model of the glasses; generating a virtual rendering of the glasses based on the model retrieved from the database; and superimposing the virtual rendering of the glasses onto the base image. In some implementations, comparing the at least one measurement associated with the wearable device worn by the user in the reference image to the corresponding measurement in the rendered image includes extracting the at least one measurement from the reference image based on the configuration information associated with the glasses and at least one facial landmark or at least one optical landmark detected in the reference image; extracting at least one measurement from the rendered image corresponding to the at least one measurement extracted from the reference image; and determining a difference between the at least one measurement extracted from the reference image and the corresponding at least one measurement extracted from the rendered image. In some implementations, the at least one measurement is extracted from the reference image and is converted to a metric scale using a known scale detected in the reference image. In some implementations, the at least one measurement includes at least one of a vertex distance, an interpupillary distance, an iris size, a pantoscopic height, or a pantoscopic angle associated with the glasses worn by the user.

In some implementations, the method also includes adjusting at least one algorithm associated with the simulation module based on the training of the at least one machine learning module, to incorporate the adjustment placement position of the wearable device on the user.

In another general aspect, a non-transitory computer-readable medium stores executable instructions that, when executed by at least one processor of a computing system, are configured to cause the at least one processor to capture, by an image capture assembly of the computing system, a reference image detect, in the reference image a wearable device worn by a user and at least one measurement associated with the wearable device worn by the user in the reference image; generate, by a simulation module of the computing system, a rendered image, the rendered image including a virtual rendering of a wearable device on an image of the user; compare the at least one measurement associated with the wearable device worn by the user in the reference image to a corresponding measurement in the rendered image; and in response to a determination that a difference between the at least one measurement associated with the wearable device worn by the user in the reference image and the corresponding measurement in the rendered image is greater than or equal to a threshold value, trigger the training of at least one machine learning model to adjust a placement position of the wearable device on the user.

In some implementations, the wearable device is a pair of glasses and wherein the reference image includes an image of the glasses worn on a face of the user. In some implementations, the instructions are configured to cause the at least one processor to detect the at least one measurement, including detect at least one visual marker or at least one known physical feature on a frame portion of the glasses, match the detected at least one visual marker or the detected at least one physical feature with one of a plurality of wearable devices in a database of the computing system, identify the glasses based on the matching; and retrieve configuration information associated with the glasses from the database. In some implementations, the instructions are configured to cause the at least one processor to generate the rendered image, including capture, by the image capture assembly, a base image, the base image including an image of at least a portion of a face and a head of the user, retrieve, from a database of the computing system, a model of the glasses, generate a virtual rendering of the glasses based on the model retrieved from the database, and superimpose the virtual rendering of the glasses onto the base image. In some implementations, the instructions are configured to cause the at least one processor to compare the at least one measurement associated with the wearable device worn by the user in the reference image to the corresponding measurement in the rendered image, including extract the at least one measurement from the reference image based on the configuration information associated with the glasses and at least one facial landmark or at least one optical landmark detected in the reference image; extract at least one measurement from the rendered image corresponding to the at least one measurement extracted from the reference image; and determine a difference between the at least one measurement extracted from the reference image and the corresponding at least one measurement extracted from the rendered image. In some implementations, the at least one measurement extracted from the reference image is converted to a metric scale using a known scale detected in the reference image. In some implementations, the at least one measurement includes at least one of a vertex distance, an interpupillary distance, an iris size, a pantoscopic height, or a pantoscopic angle associated with the glasses worn by the user.

In some implementations, the instructions are configured to cause the at least one processor to generate the rendered image, including capture, by the image capture assembly, a base image, the base image capturing a body portion of the user on which the wearable device is to be worn; identify the wearable device captured in the reference image; retrieve, from a database of the computing system, a model of the wearable device; and superimpose a virtual rendering of the wearable device onto the base image. In some implementations, the instructions are configured to cause the at least one processor to identify the wearable device captured in the reference image, including detect at least one visual marker or at least one known feature of the wearable device in the reference image; and identify the wearable device based on the detected at least one visual marker or the at least one known feature. In some implementations, the instructions are configured to cause the at least one processor to identify the wearable device, including match the detected at least one visual marker or the at least one known feature with the wearable device in a database of the computing system; and retrieve configuration information associated with the wearable device from the database. In some implementations, the instructions are configured to cause the at least one processor to trigger the training of the at least one machine learning model, including adjust at least one algorithm associated with the simulation module based on the training of the at least one machine learning module, to incorporate the adjustment placement position of the wearable device on the user.

The details of one or more implementations are set forth in the accompanying drawings and the description below. Other features will be apparent from the description and drawings, and from the claims.

BRIEF DESCRIPTION OF THE DRAWINGS

Example embodiments will become more fully understood from the detailed description herein and the accompanying drawings, wherein like elements are represented by like reference numerals, which are given by way of illustration only and thus are not limiting of the example embodiments.

DETAILED DESCRIPTION

Figure 1A:
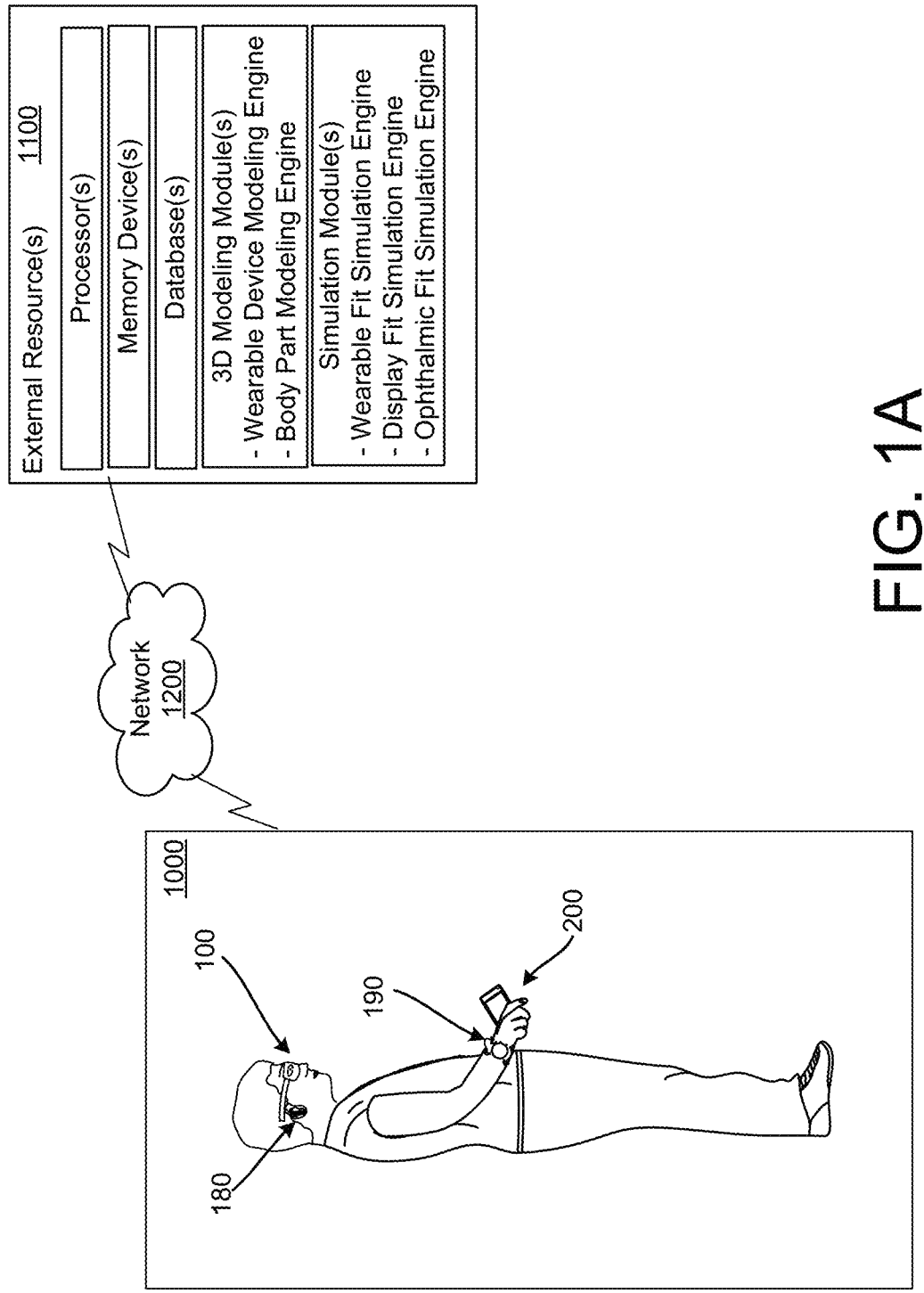
FIG. 1A illustrates an example system, in accordance with implementations described herein.

This disclosure relates to systems and methods involved in the virtual selection and fitting of a wearable device. In particular, this disclosure relates to the validation of modeling and simulation systems that provide for the virtual try-on of wearable devices, such as glasses, by a user, and for the virtual fitting of selected wearable devices for the user. In some examples, this includes the determination of wearable fit parameters, display fit parameters, ophthalmic fit parameters and other such parameters associated with the fit and function of the wearable device for the user. In some examples, the systems and methods described herein may validate and improve modeling and simulation algorithms and/or machine learning models related to the virtual systems to provide an improved virtual try-on of wearable devices by the user prior to purchase. For example, the systems and methods described herein may provide for an accurate virtual representation of wearable fit and function of the wearable device as worn by the user, in a virtual try-on session, without access to a retail establishment, and without the assistance of a sales representative or proctor. In some examples, systems and methods described herein may compare a simulated fitting of the wearable device, in which a rendering of the wearable device is superimposed on an image of the user, to image data capturing the user wearing the wearable device. In particular, the comparison may include comparison(s) of the simulated fitting to a rendered image of the wearable device superimposed on a head of a test subject, as part of the process to train the algorithms and/or machine learning models to be used to facilitate the accurate placement of wearable devices on actual users during a virtual fitting session. In the example case of a wearable device in the form of a pair of glasses, the comparison may include comparison(s) of the simulated fitting to a rendered image of the glasses superimposed on the head of the test subject, as part of the process to train the algorithms and/or machine learning models to be used to facilitate the accurate placement of glasses on the heads of actual users during a virtual fitting session, without the user having to wear any type of physical glasses. In some examples, the comparison may include a comparison of one or more measurements associated with the wearable device, such as, for example, wearable fit measurements and/or display fit measurements and/or ophthalmic fit measurements, and/or other measurements that can be detected from the captured image data.

Hereinafter, systems and methods, in accordance with implementations described herein, will be described with respect to the validation and improvement of algorithms and/or machine learning (ML) models associated with the simulation of a wearable computing device in the form of a head mounted display device, such as, for example, smart glasses including a display device, on a head of a user, for purposes of discussion and illustration. The principles to be described herein may be applied to the validation and improvement of algorithms and/or machine learning models associated with the simulation of other types of wearable devices. Hereinafter, systems and methods, in accordance with implementations described herein, will be described with respect to the detection of measurements from captured image data in which the wearable device worn by the user includes one or more detectable visual markers on the wearable device and/or one or more known reference points and/or markers on the wearable device having a known scale and the like. The measurements detected from the captured image data may be compared to corresponding measurements detected in a virtual simulation including a rendering of the wearable device superimposed on an image of the user. In some examples, differences between the one or more measurements detected in the captured image data and the corresponding one or more measurements detected in the virtual simulation may represent a level of accuracy of the virtual simulation and the associated algorithm(s). In some examples, the differences between the one or more measurements detected in the captured image data and the corresponding one or more measurements detected in the virtual simulation may be taken into account in the adjustment of the associated algorithm(s).

FIG. 1A is a third person view of a user in an ambient environment 1000, with one or more external resources 1100 accessible to the user via a network 1200. FIG. 1A illustrates numerous different wearable devices operated by the user, including a first wearable device 100 in the form of glasses worn on the head of the user, a second wearable device 180 in the form of ear buds worn in one or both ears of the user, a third wearable device 190 in the form of a watch worn on the wrist of the user, and a handheld computing device 200 held by the user. In some examples, the first wearable device 100 is in the form of a pair of smart glasses including, for example, a display, a camera that can capture images of the ambient environment, audio input/output capability, user input capability and the like. In some examples, the second wearable device 180 is in the form of an ear worn computing device such as headphones, or earbuds, that can include audio input/output capability, a camera that can capture images of the ambient environment, user input capability and the like. In some examples, the third wearable device 190 is in the form of a smart watch or smart band that includes, for example, a display, a camera that can capture images of the ambient environment, audio input/output capability, user input capability and the like. In some examples, the handheld computing device 200 can include a display, a camera that can capture images of the ambient environment, audio input/output capability, user input capability, and the like, such as in a smartphone. In some examples, the example wearable devices 100, 180, 190 and handheld device 200 can communicate with each other and/or with the external resources 1100 to exchange information, to receive and transmit input and/or output, and the like. The principles to be described herein may be applied to other types of wearable devices not specifically shown in FIG. 1A.

Hereinafter, systems and methods will be described with respect to the virtual try on, or virtual fitting, of a head mounted wearable device, simply for ease of discussion and illustration. The head mounted wearable devices described herein may include, for example, consumer grade eyeglasses with or without prescription lenses, smart glasses including a display and associated computing capability, with or without prescription lenses, and other such head mounted wearable devices. As noted above, the principles to be described herein may be similarly applied to the virtual try on, or virtual fitting, of other types of wearable devices.

In some situations, a user may choose to use a computing device (such as, for example, the handheld computing device 200 shown in FIG. 1A, or another computing device) to access a virtual try on feature for selection and fitting of a wearable device, such as the glasses 100 described above. For example, a user may use an application executing on the example computing device 200 to select glasses for virtual try on from external resources 1100 available via the network 1200.

When making use of a virtual try on feature for selection and fitting of a wearable device such as the glasses 100, a simulation module (for example, available from the external resources) may predict where a three-dimensional model of the glasses 100 will be worn on a three-dimensional scan of the head of the user. This simulated placement of the glasses 100 on the head of the user may help to identify which, of a plurality of available glasses (for example, having configuration data available in a database of the external resources 1100) will fit the user. In a case in which the glasses 100 are smart glasses including a display device, this simulated placement of the glasses 100 on the head of the user may identify which of the plurality of available glasses will provide for placement of the display device such that displayed content will be visible to the user. The ability to simulate a pose (i.e., a position and/or orientation) of the glasses 100 on the head of the user facilitates the iteration of future designs for glasses, allowing for further refinement of physical/wearable fit, display fit/display visibility, and other such factors. The ability to effectively use virtual try on to achieve these results relies on the ability of the simulation module to accurately predict and simulate how the glasses will fit on the head of the user. Inaccuracy in the simulation of the pose and fit of the glasses on the head of the user may result in glasses that do not properly fit the user and/or do not work as intended for the user, rendering the virtual try on process ineffective.

In some examples, the virtual try on session may include the use of sizing frames having one or more visual markers and/or one or more known features that are detectable in image data captured via the application executing on the computing device. In this situation, the one or more markers and/or the one or more known features detected within the captured image data may be used to identify a size and/or type and/or configuration of the sizing frames (for example, included in a wearable device database of the external resources 1100), and to detect wearable fit and/or display fit and/or ophthalmic fit measurements and the like based on the known configuration of the sizing frames. The detected measurements may then be used to identify sizes and/or configurations of frames that may be a comfortable fit for the user, that may accommodate any corrective lenses that may need to be incorporated, that may provide for the integration of display components so that displayed content is visible within the field of view of the user, and the like. In some examples, in which the wearable device includes eye tracking capability, the detected measurements may also be used to determine an eye tracking fit, to provide a measure of how visible the eye(s) of the user will be to a tracking device provided on a particular frame. A simulation of the identified frames (including a display and/or corrective lenses if applicable) may be generated (for example, by a simulation engine based on three-dimensional models of the frame, and three-dimensional models of the head of the user available by simulation and modeling modules of the external resources 1100).

In some situations, it may be preferable to conduct a virtual try on session in a more streamlined manner, without the use of sizing frames. In a situation in which sizing frames including the types of features described above are not incorporated into the virtual try on process to provide a basis for relative measurement, an accurate simulation of the appearance and fit of the glasses on the face of the user, with the simulation matching the actual configuration of the glasses, is more challenging to achieve. However, generation of an accurate simulation (for example, by a simulation engine of the external resources 1100) and an accurate correspondence of the virtual simulation with how a selected pair of glasses will actually fit is critical in ensuring proper fit and function of the product that is eventually delivered to the user as a result of the virtual try on session.

Accordingly, systems and methods, in accordance with implementations described herein, provide for the validation of the virtual simulation of the wearable device on the corresponding portion of the body of the user. Hereinafter, example systems and methods will be described that provide for the validation of the virtual simulation of a wearable device in the form of a head mounted wearable device, or glasses, on the head and/or face of the user, so that the simulated fit corresponds to the fit of the actual glasses on the head/face of the user. The example systems and methods include comparison of wearable fit and/or display fit and/or ophthalmic fit measurements detected in image data of the user wearing the glasses, with the corresponding wearable fit and/or display fit and/or ophthalmic fit measurements detected in the virtual simulation of the glasses on the head/face of the user.

Figure 1B:
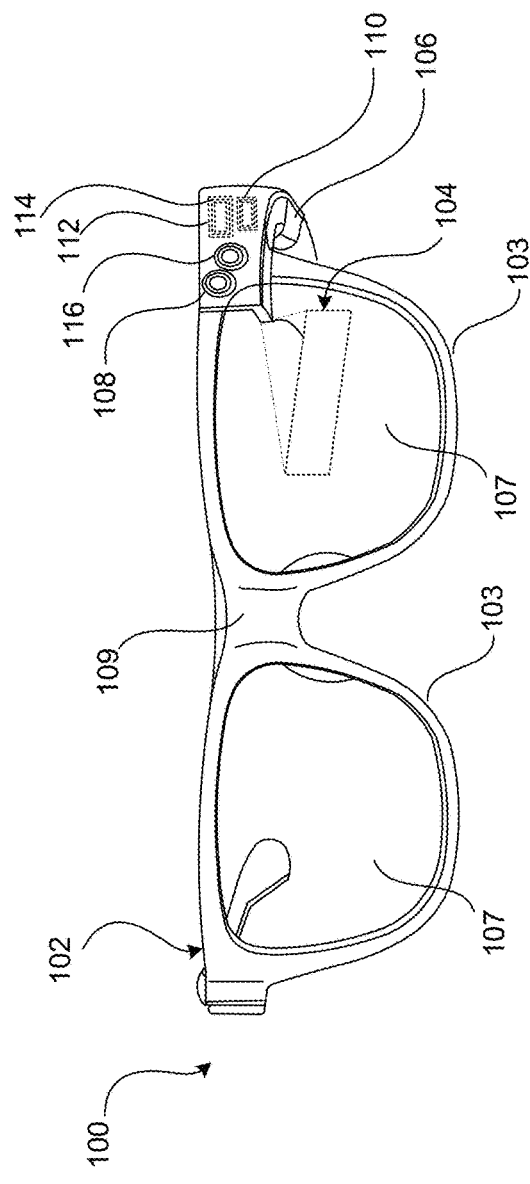
FIG. 1B is a front view.
Figure 1C:
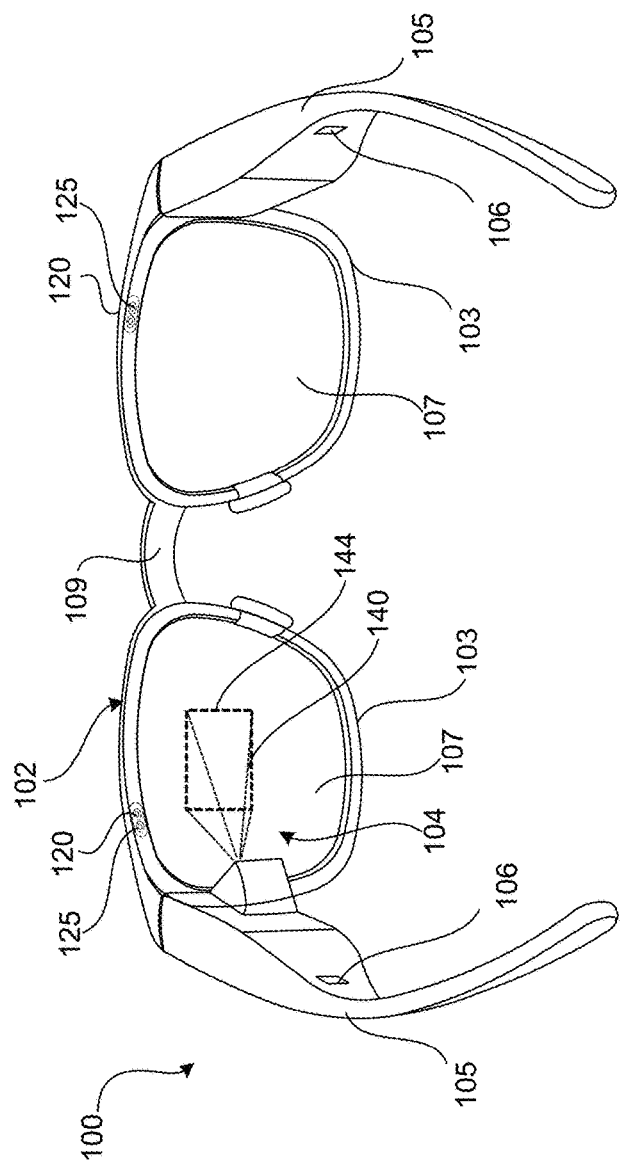
FIG. 1C is a rear view, of an example wearable device shown in FIG. 1A, in accordance with implementations described herein.

An example head mounted wearable device 100 in the form of a pair of smart glasses is shown in FIGS. 1B and 1C, for purposes of discussion and illustration. The example head mounted wearable device 100 includes a frame 102 having rim portions 103 surrounding glass portion 107, or lenses 107, and arm portions 105 coupled to a respective rim portion 103. In some examples, the lenses 107 may be corrective/prescription lenses. In some examples, the lenses 107 may be glass portions that do not necessarily incorporate corrective/prescription parameters. A bridge portion 109 may connect the rim portions 103 of the frame 102. In this example, in which the wearable device 100 is in the form of a pair of smart glasses, or augmented reality glasses, a display device 104 may be coupled in a portion of the frame 102, for example in the arm portion 105 of the frame 102, with an eye box 140 extending toward at least one of the lenses 107, for output of content at an output coupler 144 at which content output by the display device 104 may be visible to the user. In some examples, the output coupler 144 may be substantially coincident with the lens(es) 107. In this form, the wearable device 100 can also include an audio output device 106 (such as, for example, one or more speakers), an illumination device 108, a sensing system 110, a control system 112, at least one processor 114, and an outward facing image sensor 116, or camera 116. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some examples, a gaze tracking device 120 including, for example, one or more sensors 125, may detect and track eye gaze direction and movement. Data captured by the sensor(s) 125 may be processed to detect and track gaze direction and movement as a user input. In some implementations, the sensing system 110 may include various sensing devices and the control system 112 may include various control system devices including, for example, one or more processors 114 operably coupled to the components of the control system 112. In some implementations, the control system 112 may include a communication module providing for communication and exchange of information between the wearable device 100 and other external devices.

The example wearable device 100 can include more, or fewer features than described above. The principles to be described herein are applicable to the virtual sizing and fitting of head mounted wearable devices including computing capabilities, i.e., smart glasses, and also to head mounted wearable devices that do not include computing capabilities, and to head mounted wearable devices with or without corrective lenses.

In a head mounted wearable device such as the example wearable device 100 shown in FIGS. 1A-1C, wearable fit parameters take into account how a frame 102 fits on a particular user and/or looks and/or feels on a particular user.

Wearable fit parameters may take into account, for example whether the frame 102 is wide enough to be comfortable with respect to the user's temples, whether the rim portions 103 and bridge portion 109 are sized so that the bridge portion 109 can rest comfortably on the bridge of the user's nose, whether the arm portions 105 are sized to comfortably rest on the user's ears, and other such comfort related considerations. Wearable fit parameters may take into account as-worn parameters including how the user naturally wears the wearable device 100, such as, for example, head posture/how the user naturally holds his/her head, how the user positions the wearable device 100 relative to his/her face, and the like. Wearable fit parameters may also take into account whether the size and/or shape and/or contour of the frame 102 is aesthetically pleasing to the user, and is compatible with the user's facial features.

Display fit parameters may provide an indication of placement of the display device 104 so that content displayed by the display device 104 is visible to the user and/or that color and/or brightness of content viewed by the user is substantially uniform and/or substantially accurately perceived by the user, and other such factors. For example, display fit parameters may provide an indication of placement of the display device 104 so that content displayed by the display device 104 is captured within at least a set portion of the field of view of the user. For example, the display fit parameters may be used to ensure that at least a set level of gazability is provided. This may correspond to an amount, or portion, or percentage of the display of content that is visible to the user at a set brightness level and a set pupil size at a periphery (for example, a least visible corner) of the field of view of the user. In a wearable device configured as smart glasses, or augmented reality glasses, the display fit parameters may be used to configure the display device 104 to provide the best possible placement of the display of content to the user.

Figure 2A:
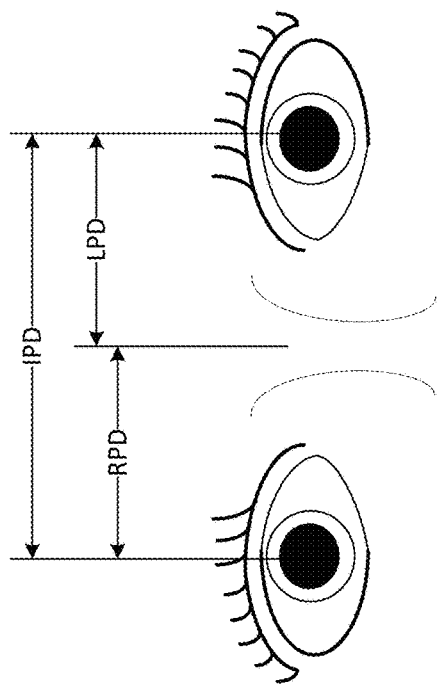
FIGS. 2A-2D illustrate example ophthalmic measurements.
Figure 2B:
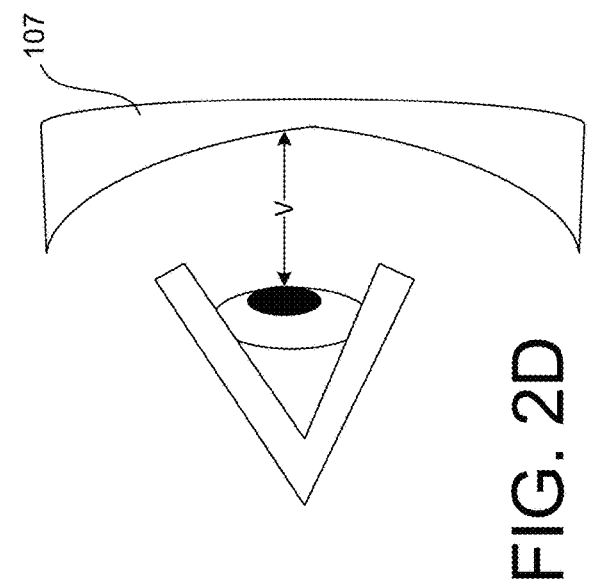
Figure 2C:
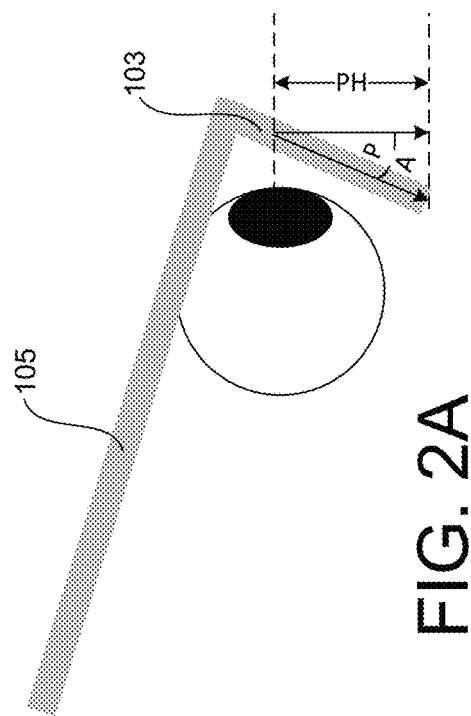
Figure 2D:
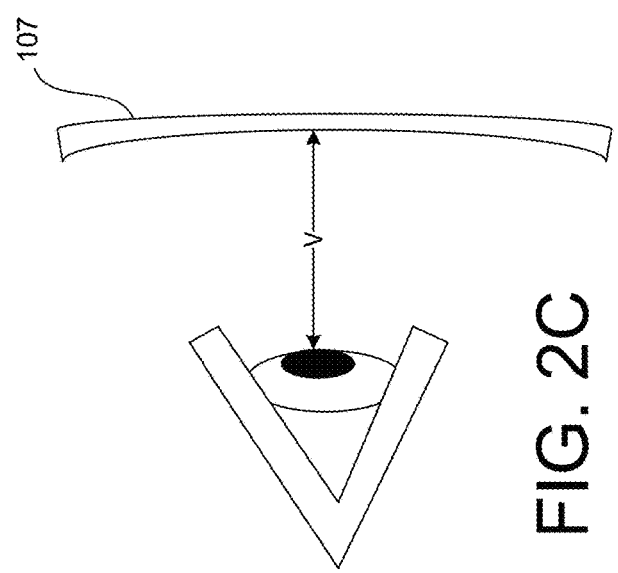

Ophthalmic fit parameters, or ophthalmic fit measurements may be taken into account when the lenses 107 to be incorporated into the wearable device 100 are prescription, or corrective lenses. Some example ophthalmic fit measurements are shown in FIGS. 2A-2D. Ophthalmic fit measurements may include, for example, a pupil height PH (a distance from a center of the pupil to a bottom of the lens 107), an interpupillary distance IPD (a distance between the pupils), a monocular pupil distance, for example, a left pupil distance LPD (a distance from a central portion of the bridge of the nose to the left pupil) and a right pupil distance RPD (a distance from the central portion of the bridge of nose to right pupil), a pantoscopic angle PA (an angle defined by the tilt of the lens 107 with respect to vertical), a vertex distance V (a distance from the cornea to the lens 107), and other such parameters, or measures. FIG. 2C illustrates a vertex distance V associated with a relatively low diopter lens 107. FIG. 2D illustrates a vertex distance V associated with a relatively higher diopter lens 107. Ophthalmic fit measurements may be taken into account when fitting the wearable device 100 including the display device 104, to provide for placement of the display of content by the display device 104 within an eye box defined by a three-dimensional volume extending between the lens 107 and the eye of the user, where the display of content will be within the field of view of the user, and thus visible to the user. Ophthalmic fit measurements may also be taken into account when fitting the wearable device 100 including the prescription, or corrective lenses into the frame 102 of a wearable device that does not include computing and/or display capability.

Figure 3A:
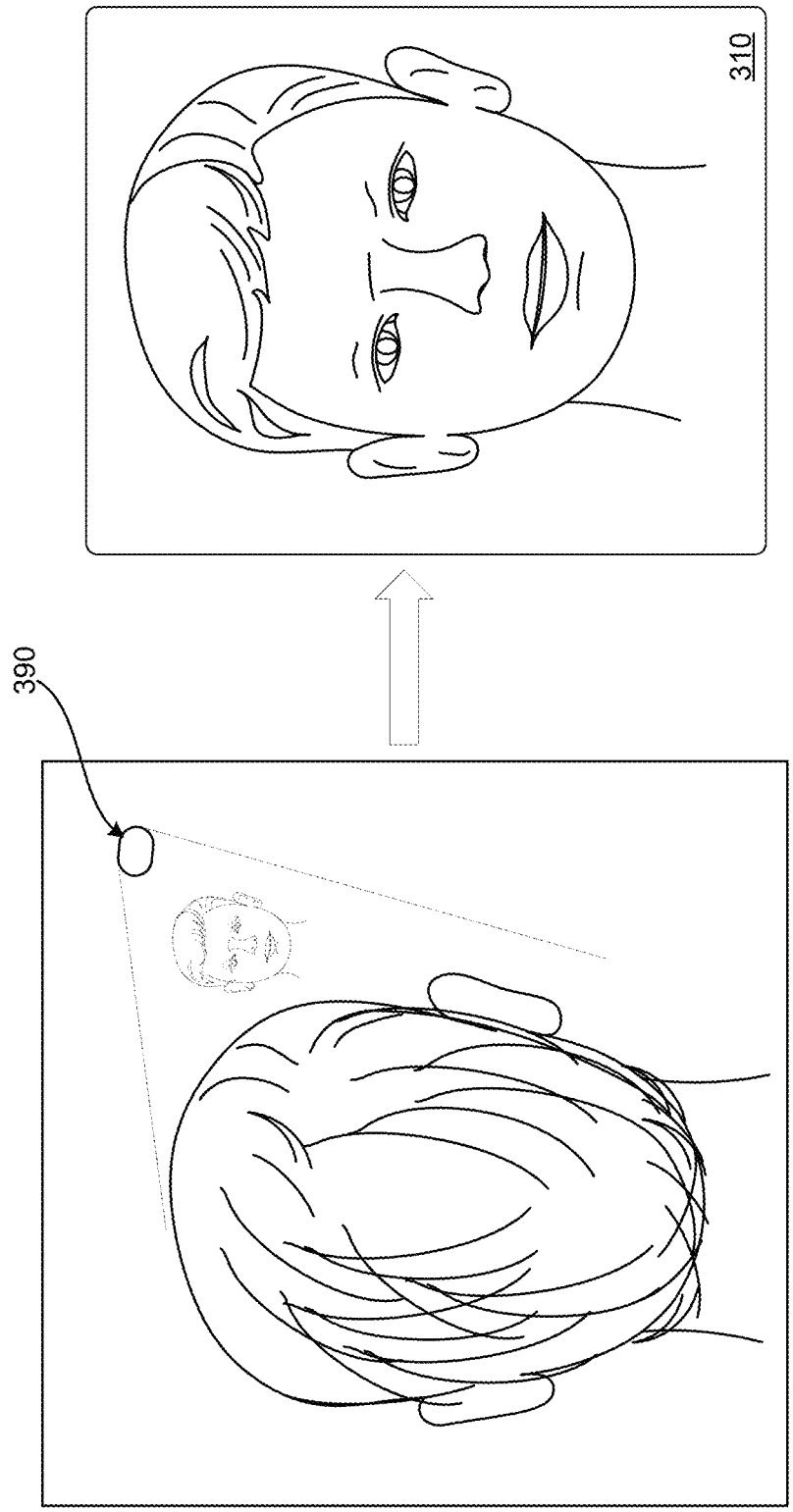
FIG. 3A illustrates the capture of an example base image, in accordance with implementations described herein.
Figure 3B:
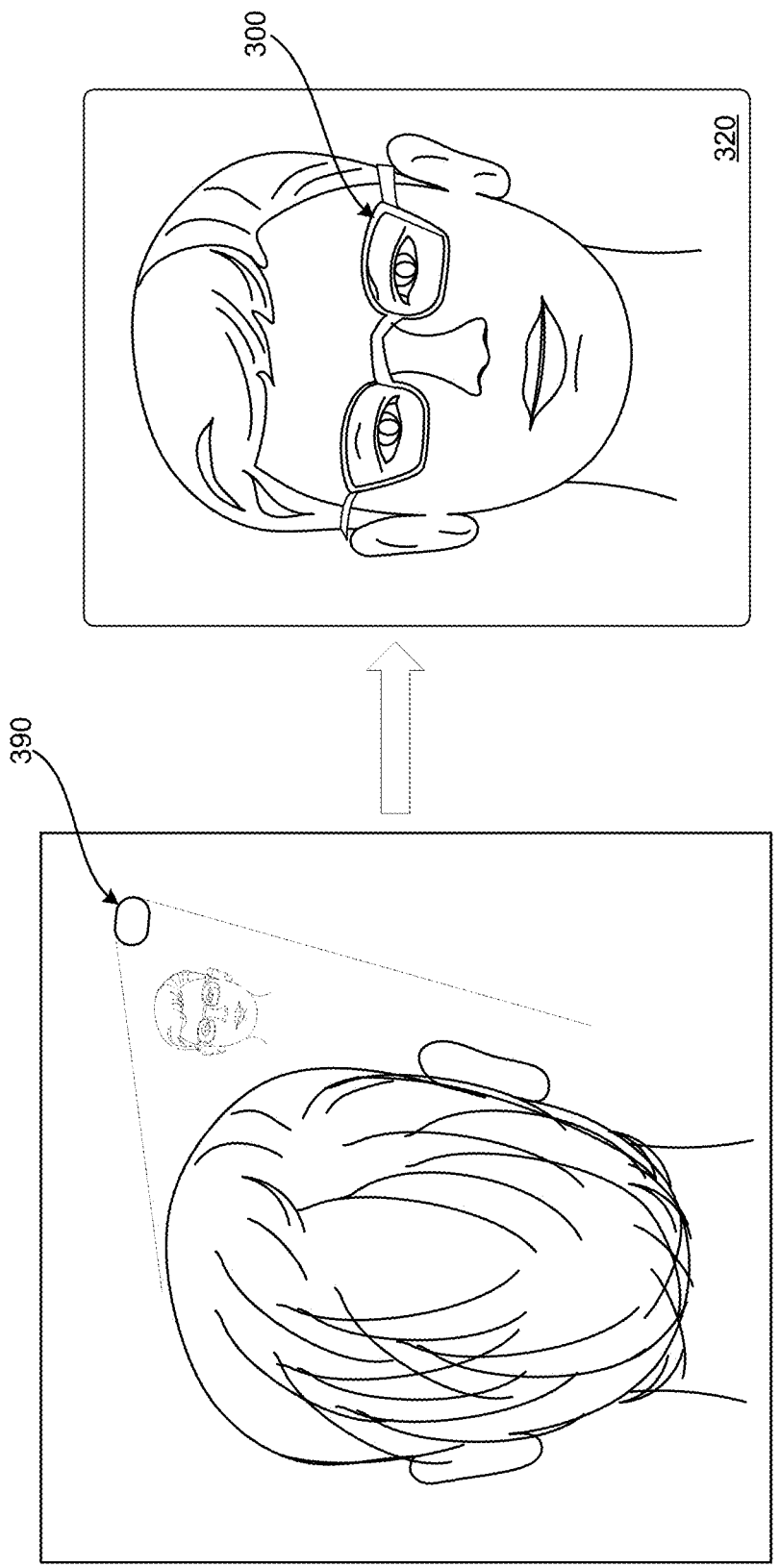
FIG. 3B illustrates the capture of an example reference image, in accordance with implementations described herein.
Figure 3C:
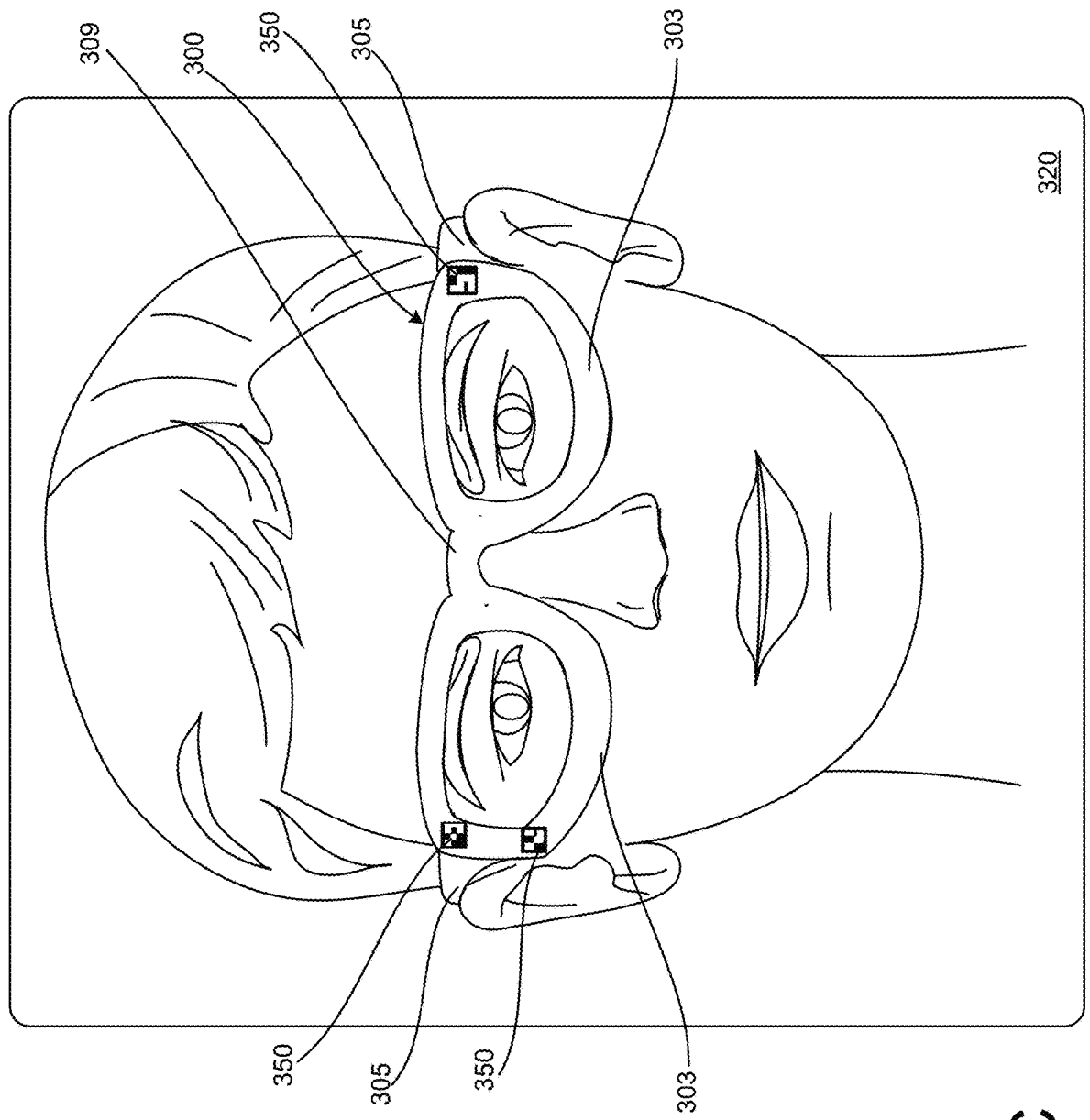
FIGS. 3C and 3D illustrate the detection of measurements associated with a wearable device captured in the example reference image.
Figure 3D:
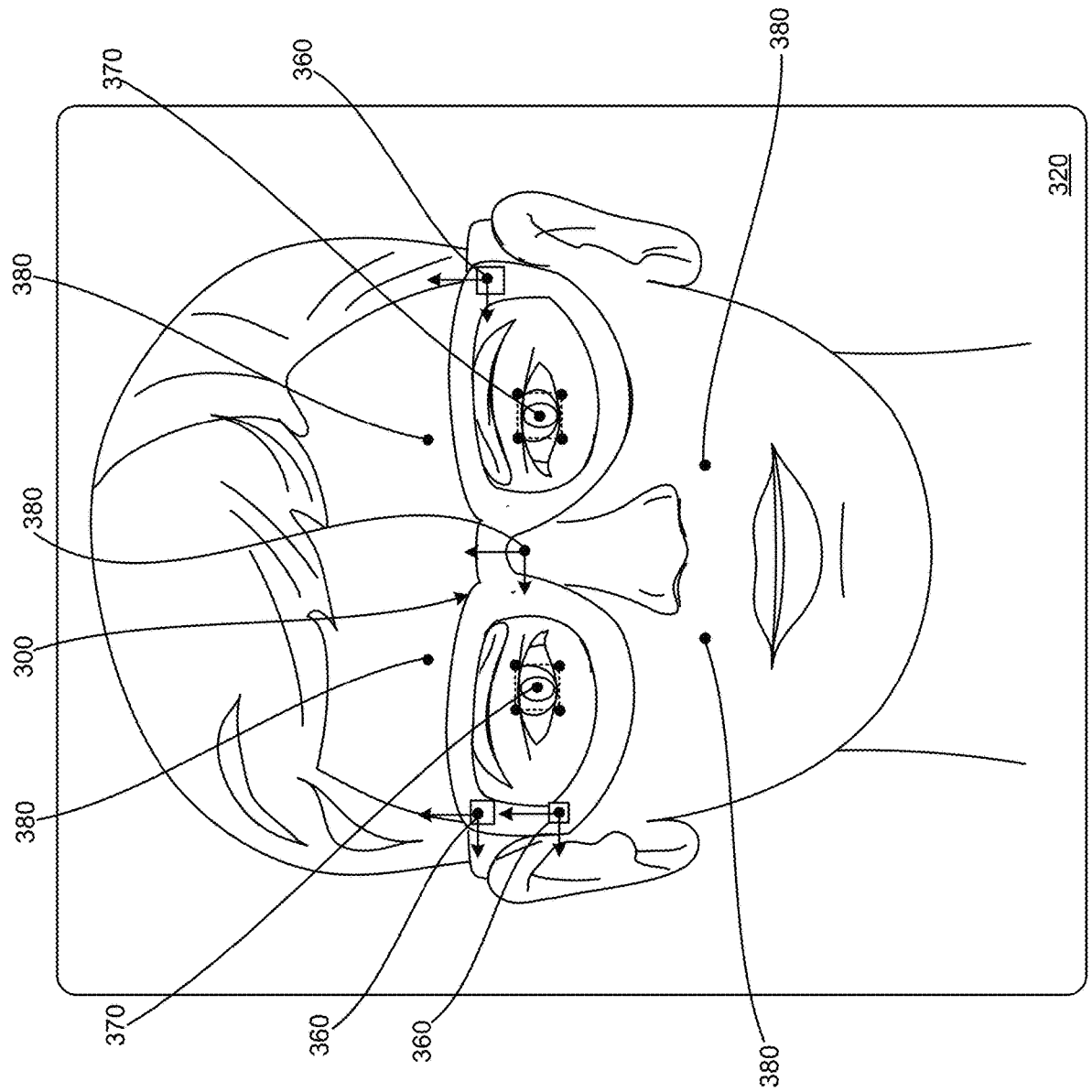
Figure 4A:
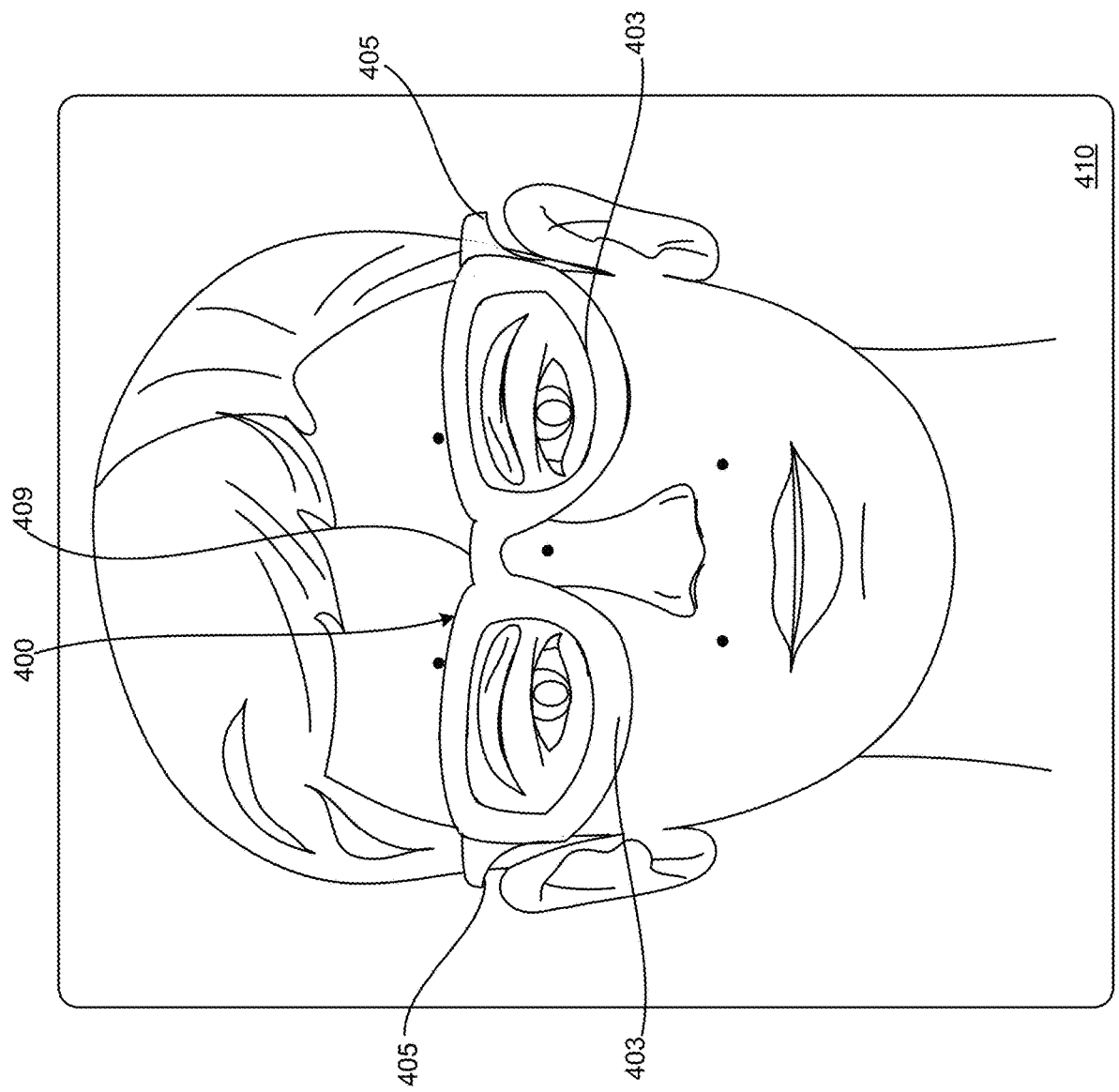
FIG. 4A illustrates the generation of an example rendered image, in accordance with implementations described herein.
Figure 4B:
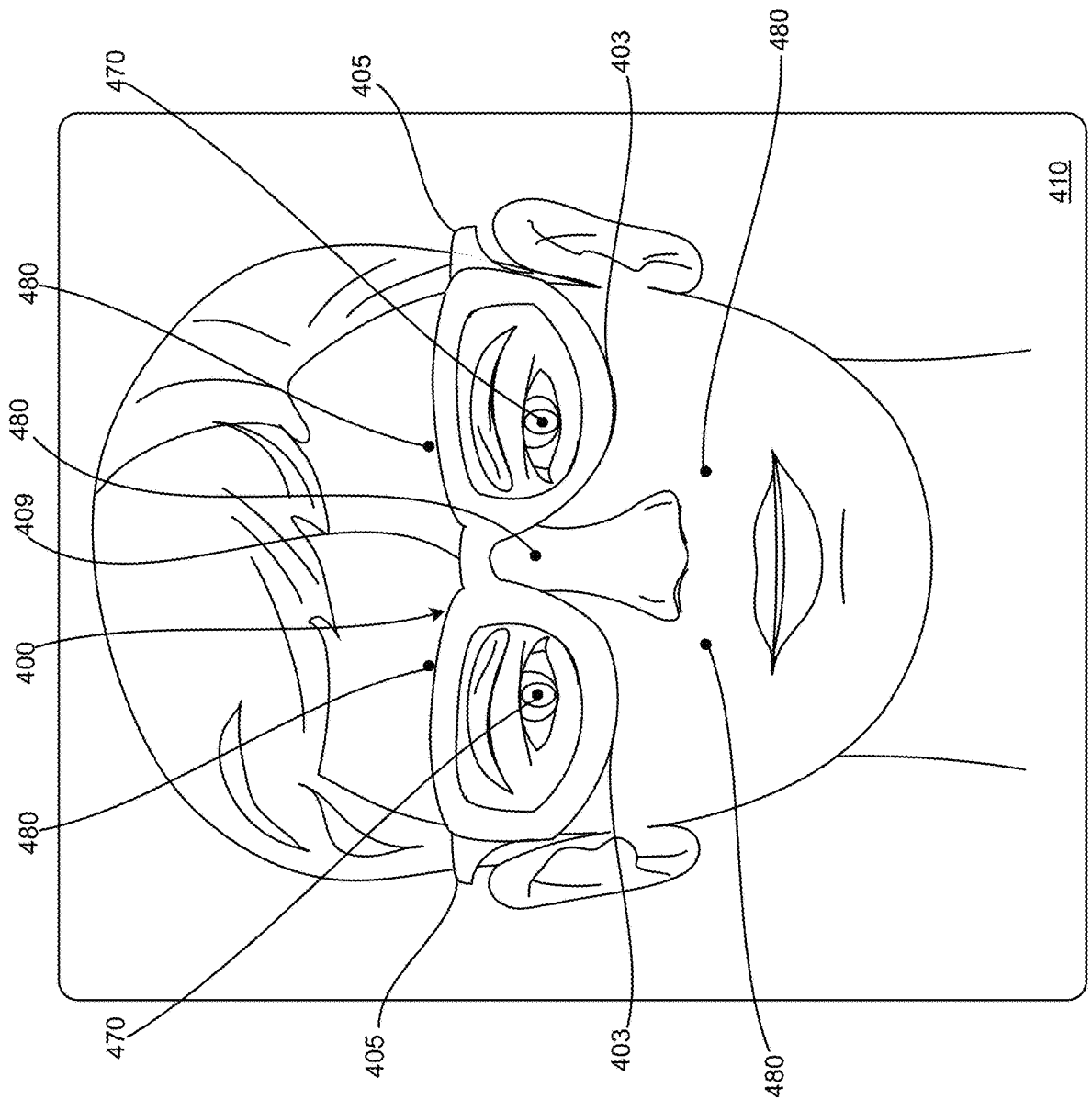
FIG. 4B illustrates the detection of measurements associated with a rendering of a wearable device included in the example rendered image.

FIGS. 3A-4B illustrate a process for validation of a simulated virtual try on (and associated algorithms and/or machine learning models) for a wearable device, in accordance with implementations described herein. In particular, FIGS. 3A-3D illustrate a process in which an image of a user wearing a pair of sizing frames is captured, and sizing measurements (i.e., wearable fit measurements and/or display fit measurements and/or ophthalmic fit measurements) are detected from the captured image. FIG. 4A illustrates a virtual simulation, generated, for example by a simulation module) of the user wearing glasses corresponding to the sizing frames shown in FIGS. 3A-3D. FIG. 4B illustrates the detection of sizing measurements (i.e., wearable fit measurements and/or display fit measurements and/or ophthalmic fit measurements) corresponding to the sizing measurements in FIG. 3D, detected from the image of the user wearing the sizing frames.

As shown in FIG. 3A, a base image 310 is captured of the face and at least a portion of the head of the user. In the base image 310, the user is not wearing sizing frames or glasses. In some examples, the base image 310 is captured by an image capture assembly 390. The image capture assembly 390 may include, for example one or more image sensors and/or cameras and/or light sensors in various different arrangements and/or combinations, one or more lighting devices, and other such components that facilitate the capture of the base image 310. The image capture assembly 390 can include any type of device that is capable of capturing an image of the face and head of the user in the manner described.

In FIG. 3B, a reference image 320 is captured by the image capture assembly 390. The reference image 320 captures the face and head of the user, similar to the base image 310, but with the user wearing an example sizing frame 300, or reference frame 300. As shown in FIG. 3C, the reference frame 300 includes first and second rim portions 303, each defining an area in which a respective lens is, or can be, positioned. A bridge portion 309 connects the rim portions 303. First and second arm portions 305 are coupled, for example pivotably coupled to the first and second rim portions 303, respectively. In the example shown in FIG. 3C, the example reference frame 300 includes visual markers 350. The example visual markers 350 shown in FIG. 3C are each defined by a substantially rectangular boundary forming twelve corners that may themselves serve as markers or indices lying in the plane of the reference frame 300 that may provide information used to determine a three-dimensional pose of the reference frame 300. In the example shown in FIG. 3C, each of the visual markers 350 includes a pattern that can provide configuration information related to the reference frame 300 (i.e., size of the reference frame 300, contour of the rim portions 303, length of the bridge portion 309, length of the arm portions 305, distance between the arm portions 305, angle of the rim portions 303 relative to the arm portions 305, and other such information). In some examples, the distinct patterns within the visual markers 350 can provide additional information related to the pose of the reference frame 300 relative to various facial features of the user. The three-dimensional pose of the reference frame 300 may be determined based on the known configuration of the reference frame 300, and the information provided by the visual markers 350 as described above.

In the example shown in FIG. 3C, the visual markers 3C are defined by three substantially rectangular patterns provided on the rim portions 303 of the reference frame 300, simply for purposes of discussion and illustration. In some examples, the reference frame 300 can include more, or fewer visual markers arranged differently on the reference frame 300. In some examples, similar information may be extracted through detection of defined features of the reference frames 300, such as, for example, detection of the bridge portion 309, detection of the respective coupling points of the first and second rim portions 303 with the first and second arm portions 305, and other such detectable features. In some examples, known configuration information associated with the reference frame 300 may be supplied in connection with the capture of the reference image 320, so that configuration information associated with the reference frame 300 is known.

The three-dimensional pose of the reference frames 300 on the face of the user may be determined based at least in part on detected features as shown in FIG. 3D. For example, the coordinate positions 360 shown in FIG. 3D correspond to detected positions of the visual markers 350. In some examples, pupils, and in particular a pupil center 370 for each eye of the user, may be detected in reference image 320. In some examples, other facial landmarks 380 may be detected in the reference image 320. In the example shown in FIG. 3D, facial landmarks 380 include the bridge of the nose, a quadrant surrounding the bridge of the nose at the temple and checks, simply for purposes of discussion and illustration. Other facial landmarks may be detected to facilitate the identification of features related to positioning of the reference frame 300 on the head/face of the user. In some examples, features detected in the reference image 320 may be measured in pixels, or pixel units, which may then be converted to a metric scale, such as, for example millimeters, based on a detected known feature in the reference image 320. For example, a vertex distance, representing the distance between the surface of the eye and a lens surface (corresponding to a detected portion of the rim portions 303), may be detected based on, for example a known reference point or object also in the reference image 320. In some examples, interpupillary distance and/or right pupil distance and/or left pupil distance, iris size, pantoscopic height, pantoscopic angle, and other such measurements may be detected based on the detection of the visual markers 350 (and/or other known markers and/or features associated with the reference frames 300) that may provide for scale in the reference image 320.

FIG. 4A illustrates a rendered image 410 including a virtual simulation of the placement of a pair of glasses on the face and at least a portion of the head of the user. The rendered image 410 shown in FIG. 4A may include a rendering of a virtual frame 400 superimposed on the face of the user as captured in the base image 310. The rendered image 410 may be generated by, for example, a simulation engine of the external resources 1100, based on three-dimensional model data provided by modeling engines of the external resources 1100. In this example, the virtual frames 400 included in the rendered image 410 correspond to the reference frames 300 included in the base image 310. This may provide a basis from which to validate the accuracy of the rendered image 410 produced by the simulation engine, and the simulated fit of the virtual frames 400 on the user in the rendered image 410, compared to the actual fit of the physical glasses, i.e., the reference frames 300, on the user.

As shown in FIG. 4A, the virtual frames 400 include first and second rim portions 403, each defining an area in which a respective lens is, or can be, positioned, with a bridge portion 409 connecting the rim portions 403, and first and second arm portions 405 pivotably coupled to the first and second rim portions 403, respectively. The rim portions 403, arm portions 405 and bridge portion 409 of the virtual frames 400 may correspond to the rim portions 303, arm portions 305 and bridge portion 309, respectively, of the reference frame 300. A position of the virtual frame 400 on the face of the user relative to the facial landmarks 480, and pupil center(s) 470 is illustrated in FIG. 4B, to provide a frame of reference.

A pose (i.e., a position and/or an orientation) of the virtual frames 400 on the face of the user in the rendered image 410 shown in FIG. 4A may be compared to the actual physical position of the reference frames 300 on the face of the user as captured in the reference image 320 shown in FIG. 3B, to validate the virtual simulation. In some examples, the plurality of features detected in the reference image 320 (i.e., pupil center 370, facial landmarks 380 and the like) may be used to approximate a three-dimensional mesh of the head and/or face of the user to generate the virtual simulation. In some examples, the generation of this three-dimensional mesh may be generated by a simulation engine of the external resources 1100. This comparison may be made based on measurements extracted from the reference image 320, compared to measurements extracted from the rendered image 410. That is, a level of accuracy of the simulation modeling may be assessed and/or validated by comparing one or more of the wearable fit measurements and/or ophthalmic fit measurements described above. In some examples, the comparison may include a comparison of features of the reference frames 300 with respect to facial landmarks 380 and/or pupil center 370 detected in the reference image 320, with the corresponding features of the virtual frames 400 with respect to the corresponding pupil center(s) 470 and/or facial features 480 in the rendered image 410.

In particular, as described above, the detection of visual markers 350 and/or other known features of the reference frames 300, pupil center(s) 370, and various facial landmarks 380, from the reference image 320 may provide for a determination of measurements such as vertex distance, interpupillary distance and/or right pupil distance and/or left pupil distance, iris size, pantoscopic height, pantoscopic angle, and other such measurements. In some examples, these measurements may be measured in pixels, or pixel units of the two-dimensional image plane of the reference image 320. In a similar manner, corresponding measurements may be extracted for pose of the virtual frames 400 on the face of the user in the rendered image 410. In some examples, the measurements may be based on detection of known features of the virtual frames 400, detected pupil center(s) 470, facial landmarks 480 and the like as previously described. In some examples, corresponding measurements may be extracted from the three-dimensional models of the virtual frames and the head of the user forming the basis of the rendered image 410.

A magnitude in differences in the corresponding measurements may provide an indication of the accuracy of the modeling and simulation engines used for virtual try on sessions. In some instances, a magnitude in the difference between a set of corresponding measurements may be great enough to cause an adjustment in one or more of the modeling engines and/or in one or more of the simulation engines.

Figure 4C:
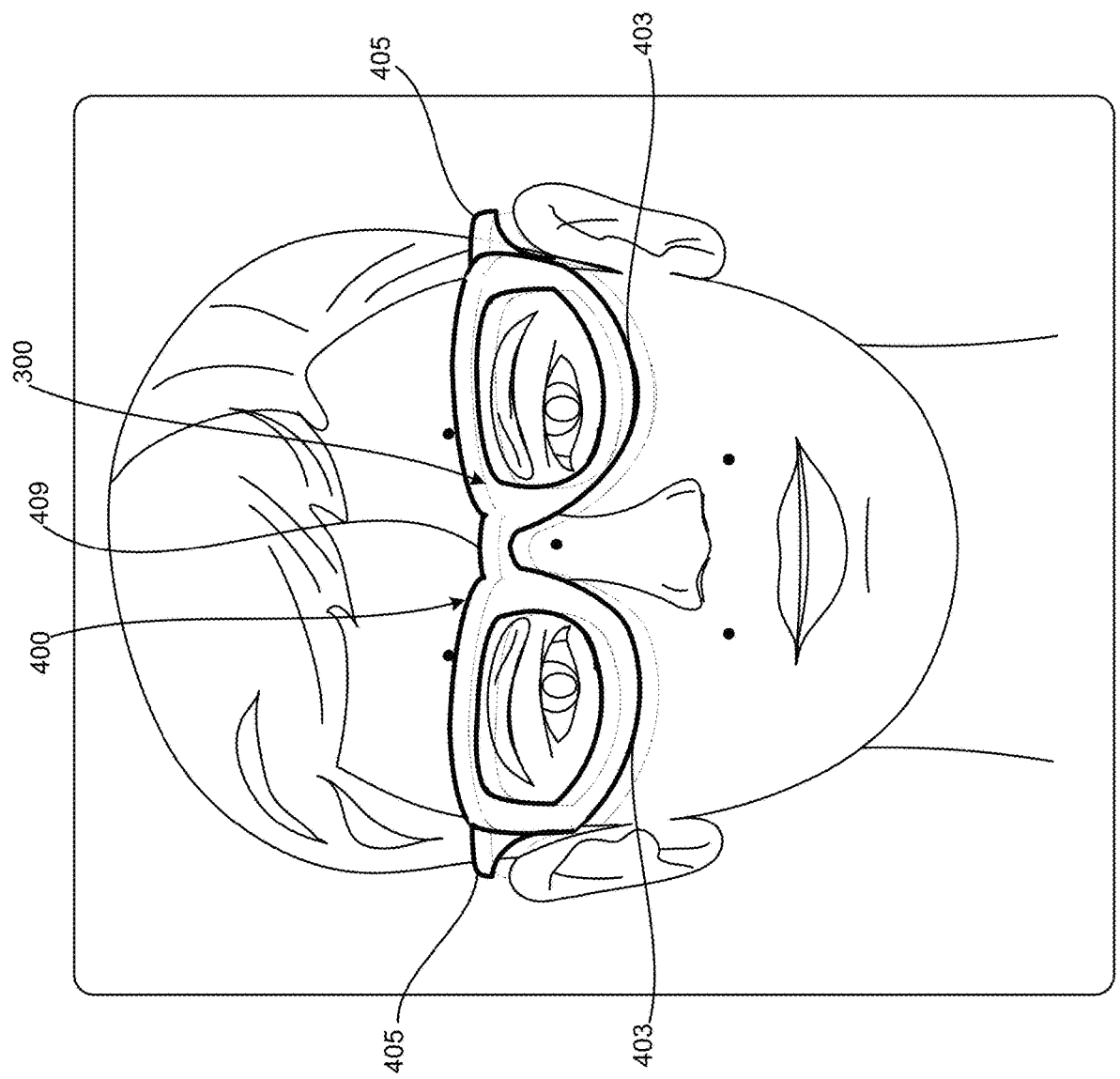
FIG. 4C illustrates a comparison of position of the wearable device in the rendered image and the wearable device in the reference image.

FIG. 4C illustrates the difference in the pose (i.e., position and/or orientation) of the virtual frames 400, compared to the pose of the reference frames 300 (shown in dashed lines) on the face of the user. This view is provided simply to illustrate the difference in pose. Determination of differences between the pose of the virtual frames 400 and the reference frames 300 is not typically a matter of simply superimposing a rendered image of the rendered image 410 onto the reference image 320. That is, there are typically differences in head pose of the user when the base image 310 is captured (which forms the basis for the rendered image 410), and when the reference image 320 is captured. Due to differences in user head pose between the capture of the base image 310 and the reference image 320, facial features, optical features and the like cannot be aligned between the base image 310 and the reference image 320, and thus cannot be accurately compared. Accordingly, FIG. 4C is just provided for illustrative purposes.

Figure 5:
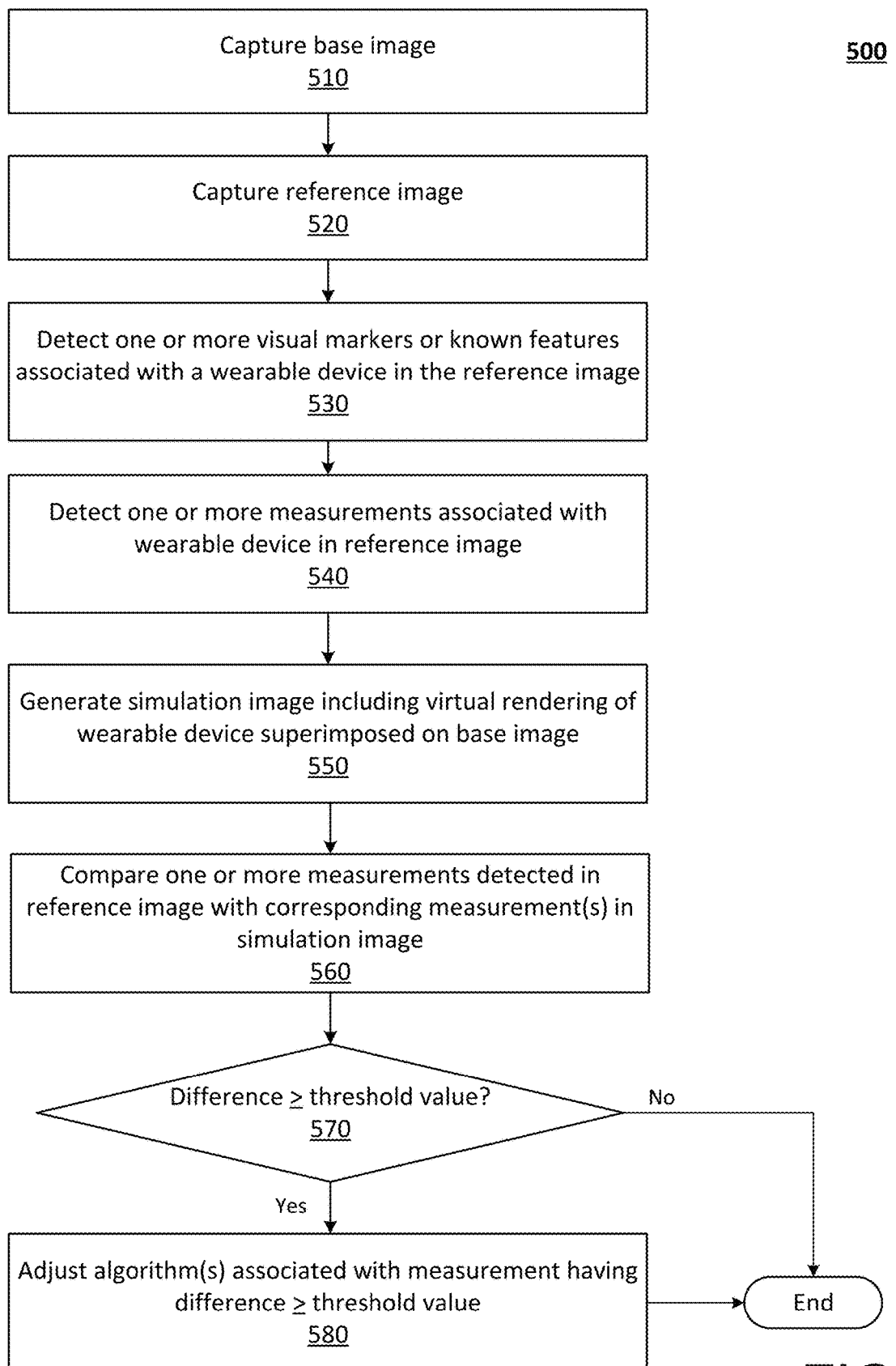
FIG. 5 is a flowchart of a method, in accordance with implementations described herein.

FIG. 5 is a flowchart of a method 500, in accordance with implementations described herein. The method 500 may provide for the validation and adjustment of algorithms and/or machine learning models associated with the simulation of a wearable device in the form of, for example, a head mounted wearable device, such as smart glasses including a display device. The principles to be described herein may be applied to the validation and adjustment of algorithms associated with the simulation of other types of wearable devices.

A base image may be captured by, for example, an image capture assembly (block 510). The base image may include an image of a body portion of a user, on which a wearable device is to be worn. For example, the base image may include an image capturing a face and head of the user, in which the user is not wearing the head mounted wearable device. A reference image may be captured by the image capture assembly (block 520). The reference image may include an image of the body portion of the user, wearing the wearable device. For example, the reference image may include an image capturing the face and head of the user wearing a reference head mounted wearable device. The head mounted wearable device may include one or more visual markers and/or one or more known features that are detectable from the reference image captured by the image capture assembly (block 530). One or more measurements associated with the head mounted wearable device may be determined based on the detected one or more visual markers and/or the one or more known features (block 540). The one or more measurements may include wearable fit measurements and/or display fit measurements and/or ophthalmic fit measurements. The one or more measurements may be indicative of a fit of the head mounted wearable device on the user.

A rendered image may be generated by, for example, a simulation engine (block 550). The simulation engine may retrieve, for example, from a database, a three-dimensional model of the head mounted wearable device, and may generate a virtual rendering of the head mounted wearable device that is superimposed on the base image to generate the rendered image. One or more measurements detected within the rendered image may be compared to the corresponding one or more measurements associated with the head mounted wearable device detected in the reference image (block 560).

When it is determined that a difference between one or more of the measurements detected from the rendered image and the corresponding measurement detected from the reference image is greater than or equal to a set threshold value (block 570), an associated algorithm and/or machine learning module may be adjusted (block 580). The adjustment of the algorithm and/or machine learning module may continue to learn and adjust an association between detected features (for example, facial features of the test subject) and detected features of the wearable device (for example, features of the glasses) based on learned association(s) between the detected features of the face of the test subject and the features of the head mounted wearable device may reduce differences between actual fit of the head mounted wearable device and the simulated fit of the head mounted wearable device, thus improving accuracy of the modeling and simulation of the fit of wearable devices during a virtual try on session.

Figure 6:
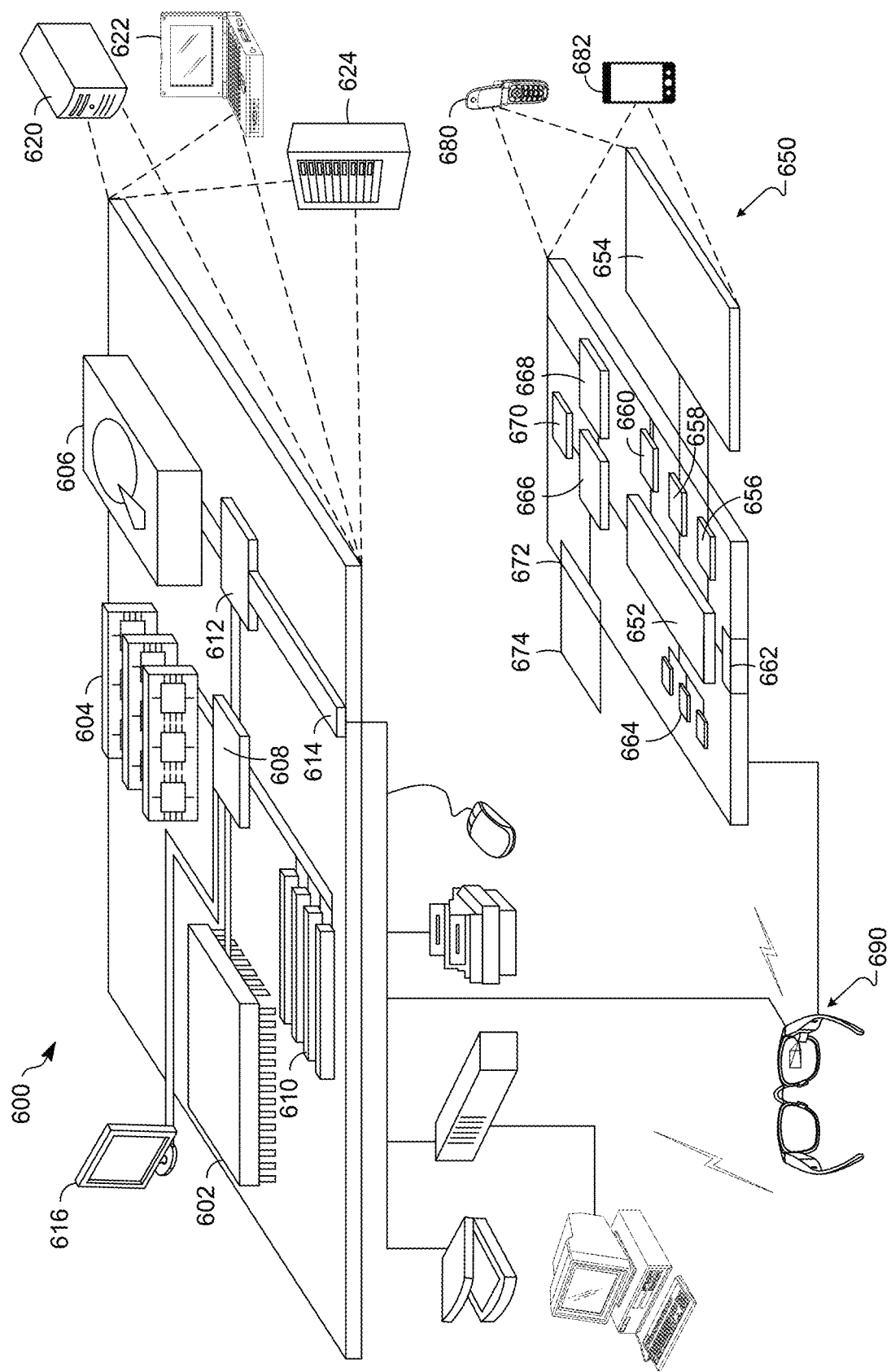
FIG. 6 illustrates example computing devices of the computing systems discussed herein.

FIG. 6 illustrates an example of a computer device 600 and a mobile computer device 650, which may be used with the techniques described here (e.g., to implement the client computing device and/or the server computing device and/or the provider resources described above). The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), and LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset 690 for example, as movements on the rendered touchpad in the AR space. The rendered movements can control virtual objects in the AR space.

In some implementations, one or more output devices included on the computing device 650 can provide output and/or feedback to a user of the AR headset 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
capturing, by an image capture assembly of a computing system, a base image, the base image including a body portion of a user on which a wearable device is to be worn;
capturing, by the image capture assembly, a reference image;
detecting, in the reference image:
the wearable device worn by the user; and
at least one measurement associated with the wearable device and at least one facial landmark or optical landmark detected in the reference image;
generating, by a simulation module of the computing system, a rendered image, the rendered image including a virtual rendering of the wearable device detected in the reference image positioned on the base image, a placement position of the virtual rendering of the wearable device on the body portion of the user in the base image being determined by a machine learning model associated with the simulation module;
comparing the at least one measurement associated with the wearable device and the at least one facial landmark or optical landmark detected in the reference image to a corresponding measurement associated with the virtual rendering of the wearable device in the rendered image; and
in response to a determination that a difference between the at least one measurement associated with the wearable device detected in the reference image and the corresponding measurement in the rendered image is greater than or equal to a threshold value, triggering training of the machine learning model to adjust the placement position of the virtual rendering of the wearable device on the body portion of the user in the base image.

2. The method of claim 1, wherein generating the rendered image includes:
identifying the wearable device captured in the reference image;
retrieving, from a database of the computing system, a model of the wearable device; and
positioning the virtual rendering of the wearable device, generated based on the model of the wearable device, onto the base image.

3. The method of claim 2, wherein identifying the wearable device captured in the reference image includes:
detecting at least one visual marker or at least one physical feature of the wearable device in the reference image; and
identifying the wearable device based on the at least one visual marker or the at least one physical feature.

4. The method of claim 3, wherein identifying the wearable device includes:
matching the at least one visual marker or the at least one physical feature with one of a plurality of wearable devices in a database of the computing system; and
retrieving configuration information associated with the wearable device from the database based on the matching.

5. The method of claim 1, wherein the wearable device is a pair of glasses and wherein generating the reference image includes generating an image of the glasses worn on a face of the user.

6. The method of claim 5, wherein detecting the at least one measurement includes:
detecting at least one visual marker or at least one physical feature on a frame portion of the glasses;
matching the at least one visual marker or the at least one physical feature on the frame portion of the glasses with one of a plurality of wearable devices in a database of the computing system;
identifying the glasses based on the matching; and
retrieving configuration information associated with the glasses from the database.

7. The method of claim 6, wherein generating the rendered image includes:
retrieving, from a database of the computing system, a model of the glasses;
generating a virtual rendering of the glasses based on the model retrieved from the database; and
positioning the virtual rendering of the glasses on the base image.

8. The method of claim 7, wherein comparing the at least one measurement associated with the wearable device and the at least one facial landmark or optical landmark detected in the reference image to the corresponding measurement in the rendered image includes:
extracting the at least one measurement from the reference image based on the configuration information associated with the glasses;
extracting at least one measurement from the rendered image corresponding to the at least one measurement extracted from the reference image; and determining a difference between the at least one measurement extracted from the reference image and the at least one measurement extracted from the rendered image.

9. The method of claim 8, wherein extracting the at least one measurement from the reference image includes converting the at least one measurement extracted from the reference image to a metric scale using a known scale detected in the reference image.

10. The method of claim 6, wherein the at least one measurement extracted from the reference image includes at least one of a vertex distance, an interpupillary distance, an iris size, a pantoscopic height, or a pantoscopic angle associated with the glasses worn by the user in the reference image.

11. The method of claim 1, further comprising:
adjusting at least one algorithm associated with the simulation module based on the training of the machine learning model, to incorporate the adjusted placement position of the virtual rendering of the wearable device on the base image of the body portion of the user.

12. The method of claim 1, wherein the placement position represents a pose of the wearable device relative to the body portion of the user, including a position and an orientation of the wearable device relative to the at least one facial landmark or optical landmark.

13. A non-transitory computer-readable medium storing executable instructions that, when executed by at least one processor of a computing system, are configured to cause the at least one processor to:
capture, by an image capture assembly of the computing system, a base image, the base image including a body portion of a user on which a wearable device is to be worn;
capture, by the image capture assembly, a reference image;
detect, in the reference image:
the wearable device worn by the user; and
at least one measurement associated with the wearable device and at least one facial landmark or optical landmark detected in the reference image;
generate, by a simulation module of the computing system, a rendered image, the rendered image including a virtual rendering of the wearable device detected in the reference image positioned on the base image, a placement position of the virtual rendering of the wearable device on the body portion of the user in the base image being determined by a machine learning model of the simulation module;
compare the at least one measurement associated with the wearable device and the at least one facial landmark or optical landmark detected in the reference image to a corresponding measurement associated with the virtual rendering of the wearable device in the rendered image; and
in response to a determination that a difference between the at least one measurement associated with the wearable device and the at least one facial landmark or optical landmark detected in the reference image and the corresponding measurement in the rendered image is greater than or equal to a threshold value, trigger training of the machine learning model to adjust the placement position of the virtual rendering of the wearable device on the body portion of the user in the base image.

14. The non-transitory computer-readable medium of claim 13, wherein the wearable device is a pair of glasses and wherein the reference image includes an image of the glasses worn on a face of the user.

15. The non-transitory computer-readable medium of claim 14, wherein the instructions are configured to cause the at least one processor to detect the at least one measurement, including:
detect at least one visual marker or at least one physical feature on a frame portion of the glasses;
match the at least one visual marker or the at least one physical feature with one of a plurality of wearable devices in a database of the computing system;
identify the glasses based on the matching; and
retrieve configuration information associated with the glasses from the database.

16. The non-transitory computer-readable medium of claim 15, wherein the instructions are configured to cause the at least one processor to generate the rendered image, including:
retrieve, from a database of the computing system, a model of the glasses;
generate a virtual rendering of the glasses based on the model retrieved from the database; and
position the virtual rendering of the glasses on the base image.

17. The non-transitory computer-readable medium of claim 16, wherein the instructions are configured to cause the at least one processor to compare the at least one measurement associated with the wearable device and the at least one facial landmark or optical landmark detected in the reference image to the corresponding measurement in the rendered image, including:
extract the at least one measurement from the reference image based on the configuration information associated with the glasses and the at least one facial landmark or optical landmark detected in the reference image;
extract at least one measurement from the rendered image corresponding to the at least one measurement extracted from the reference image; and
determine a difference between the at least one measurement extracted from the reference image and the at least one measurement extracted from the rendered image.

18. The non-transitory computer-readable medium of claim 17, wherein the instructions are configured to cause the at least one processor to convert the at least one measurement extracted from the reference image to a metric scale using a known scale detected in the reference image.

19. The non-transitory computer-readable medium of claim 15, wherein the instructions are configured to cause the at least one processor to extract the at least one measurement from the reference image including at least one of a vertex distance, an interpupillary distance, an iris size, a pantoscopic height, or a pantoscopic angle associated with the glasses worn by the user.

20. The non-transitory computer-readable medium of claim 13, wherein the instructions are configured to cause the at least one processor to generate the rendered image, including:
identify the wearable device captured in the reference image;
retrieve, from a database of the computing system, a model of the wearable device; and
position the virtual rendering of the wearable device, generated based on the model, on the body portion of the user captured in the base image.

21. The non-transitory computer-readable medium of claim 20, wherein the instructions are configured to cause the at least one processor to identify the wearable device captured in the reference image, including:

detect at least one visual marker or at least one physical feature of the wearable device in the reference image; and identify the wearable device based on the at least one visual marker or the at least one physical feature.

22. The non-transitory computer-readable medium of claim 21, wherein the instructions are configured to cause the at least one processor to identify the wearable device, including:

match the at least one visual marker or the at least one physical feature with one of a plurality of wearable devices in a database of the computing system; and retrieve configuration information associated with the wearable device from the database.

23. The non-transitory computer-readable medium of claim 13, wherein the instructions are configured to cause the at least one processor to trigger training of the machine learning model, including:

adjust at least one algorithm associated with the simulation module based on the training of the machine learning model, to incorporate the adjusted placement position of the virtual rendering of the wearable device on the base image of the body portion of the user.

24. The non-transitory computer-readable medium of claim 13, wherein the instructions are configured to cause the at least one processor to generate the rendered image including the virtual rendering of the wearable device positioned on the base image, the placement position of the virtual rendering of the wearable device representing a pose of the wearable device relative to the body portion of the user, including a position and an orientation of the wearable device relative to the at least one facial landmark or optical landmark.

* * * * *